(12) United States Patent
Xu

(10) Patent No.: US 8,249,515 B2
(45) Date of Patent: Aug. 21, 2012

(54) MOBILE COMMUNICATION DEVICE WITH ROTATING EARPIECE

(75) Inventor: Zhong Xu, Shenzhen (CN)

(73) Assignees: Fu Tai Hua Industry (Shenzhen) Co., Ltd., ShenZhen, Guangdong Province (CN); Hon Hai Precision Industry Co., Ltd., Tu-Cheng, New Taipei (TW)

(*) Notice: Subject to any disclaimer, the term of this patent is extended or adjusted under 35 U.S.C. 154(b) by 0 days.

(21) Appl. No.: 12/915,077

(22) Filed: Oct. 29, 2010

(65) Prior Publication Data

US 2012/0064940 A1    Mar. 15, 2012

(30) Foreign Application Priority Data

Sep. 13, 2010    (CN) .......................... 2010 1 0279751

(51) Int. Cl.
| | |
|---|---|
| H04B 17/00 | (2006.01) |
| H04B 1/38 | (2006.01) |
| H04B 7/00 | (2006.01) |
| H04B 15/00 | (2006.01) |
| H04M 1/00 | (2006.01) |

(52) U.S. Cl. .................. 455/67.11; 455/41.2; 455/63.1; 455/67.14; 455/556.1; 455/570

(58) Field of Classification Search ............... 455/90.1, 455/90.3, 63.1, 67.13–67.14, 114.2, 115.2, 455/283, 296, 347–350, 550.1, 569.1, 575.8, 455/41.1–41.2, 62, 66.1, 67.11–67.14, 418, 455/420, 500–501, 513, 517, 552.1, 556.1–556.2, 455/557–558, 570, 575.1–575.2, 575.6; 381/71.1, 381/71.6–71.7, 71.9, 71.14, 344–345, 355, 381/151–152, 337; 702/81, 111, 116, 182–183, 702/193; 181/20–21, 30, 123, 125, 139, 181/142, 175, 186, 242
See application file for complete search history.

(56) References Cited

U.S. PATENT DOCUMENTS

| | | | | |
|---|---|---|---|---|
| 4,588,868 | A * | 5/1986 | Bertagna et al. | 381/382 |
| 5,991,637 | A * | 11/1999 | Mack et al. | 455/563 |
| 6,233,344 | B1 * | 5/2001 | Clegg et al. | 381/374 |
| 6,377,680 | B1 * | 4/2002 | Foladare et al. | 379/392.01 |
| 6,445,799 | B1 * | 9/2002 | Taenzer et al. | 381/71.6 |
| 7,190,797 | B1 * | 3/2007 | Johnston et al. | 381/74 |
| 7,650,001 | B2 * | 1/2010 | Yasushi et al. | 381/61 |
| 7,742,790 | B2 * | 6/2010 | Konchitsky et al. | 455/570 |
| 2004/0062413 | A1 * | 4/2004 | Nassimi | 381/380 |
| 2004/0156012 | A1 * | 8/2004 | Jannard et al. | 351/158 |
| 2005/0124375 | A1 * | 6/2005 | Nowosielski | 455/550.1 |
| 2009/0001232 | A1 * | 1/2009 | Seo et al. | 248/176.1 |
| 2010/0166223 | A9 * | 7/2010 | Ranta | 381/107 |

(Continued)

*Primary Examiner* — Meless Zewdu
(74) *Attorney, Agent, or Firm* — Altis Law Group, Inc.

(57) ABSTRACT

A mobile communication device includes a main body, a communication unit, an earpiece, a mouthpiece, a comparison unit and a first driver. The communication unit generates a starting signal when the communication device and another communication device establish a connection. The earpiece rotates with respect to the main body. The mouthpiece receives ambient sound and determines an ambient noise level according to the collected ambient sound in response to the starting signal. The comparison unit determines whether the ambient noise level is equal to a predetermined value, and generates a first driving signal when the ambient noise level is not equal to the predetermined value. The first driver drives the earpiece to rotate toward an ear of a user of the mobile communication device in response to the first driving signal.

17 Claims, 5 Drawing Sheets

U.S. PATENT DOCUMENTS

| | | | |
|---|---|---|---|
| 2010/0184487 A1* | 7/2010 | Takada | 455/569.1 |
| 2011/0299695 A1* | 12/2011 | Nicholson | 381/71.6 |
| 2012/0057718 A1* | 3/2012 | Vernon | 381/71.6 |
| 2012/0058803 A1* | 3/2012 | Nicholson | 455/570 |

* cited by examiner

MOBILE COMMUNICATION DEVICE WITH ROTATING EARPIECE

BACKGROUND

1. Technical Field

The present disclosure relates to electronic communications; and particularly to a mobile communication device.

2. Description of Related Art

Due to the proliferation of mobile communication terminals, land line use has been increasingly replaced by mobile communication terminals. However, because a mobile communication terminal are used in public places, such as sports arenas and shopping malls, there is often a problem with communication quality due to ambient noise.

Therefore, there is room for improvement in the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout five views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
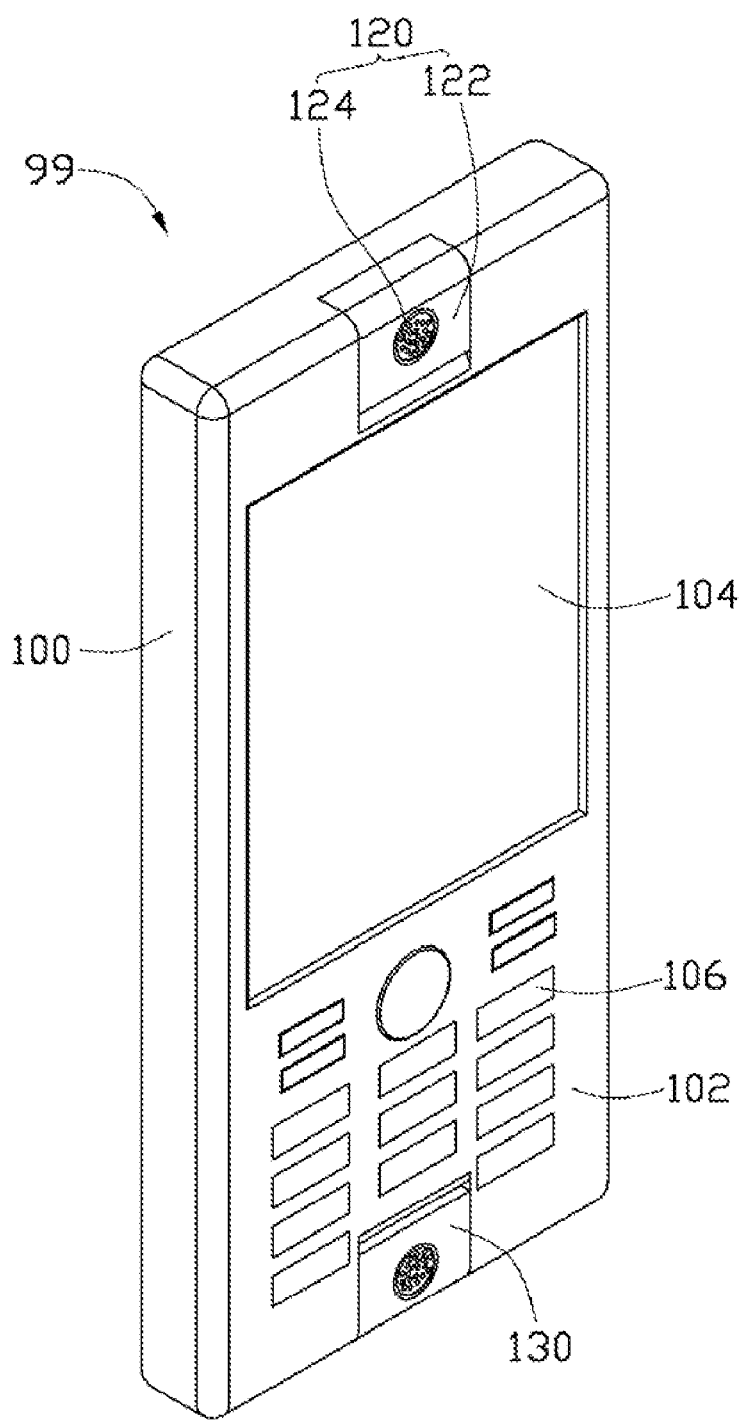
FIG. 1 is an isometric view of a mobile communication device in accordance with an exemplary embodiment.
Figure 2:
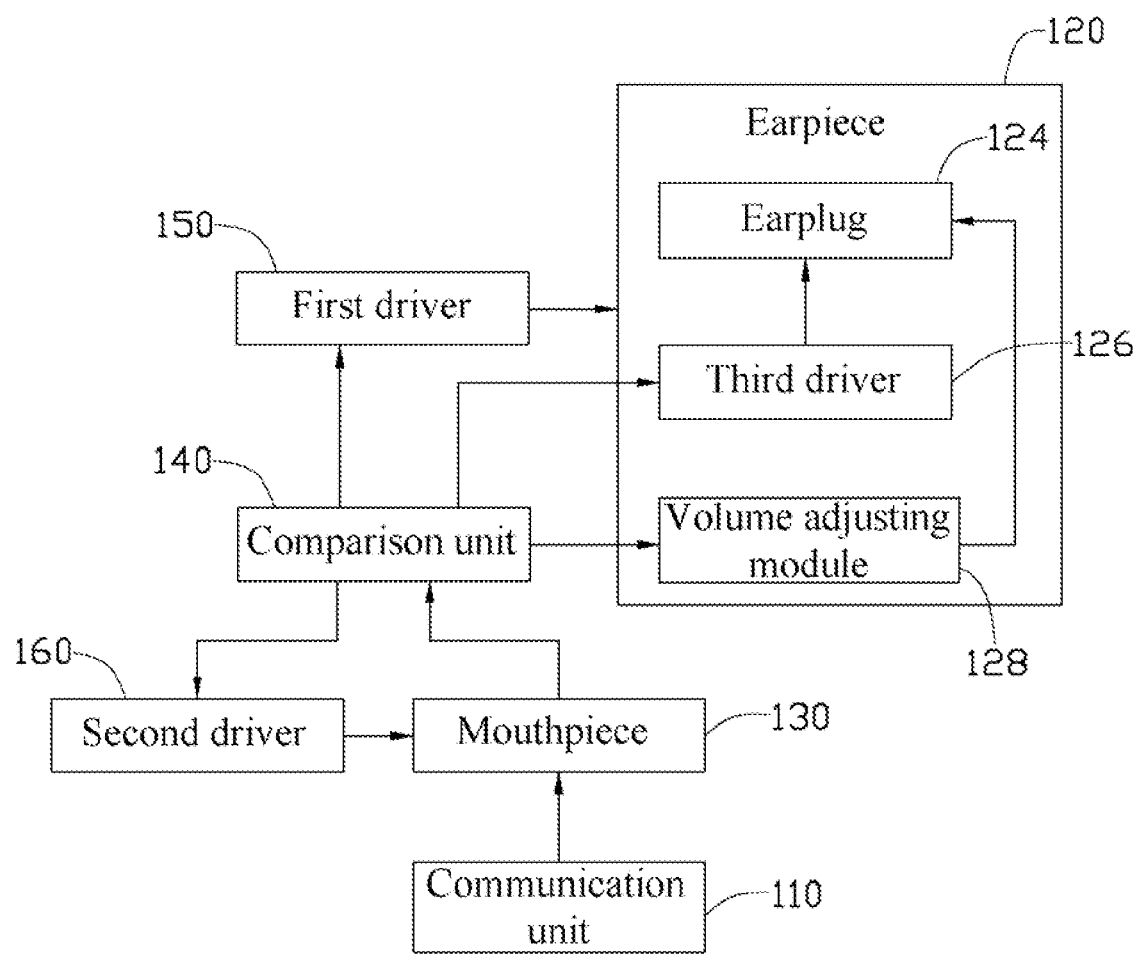
FIG. 2 is a block diagram of the mobile communication device of FIG. 1.
Figure 3:
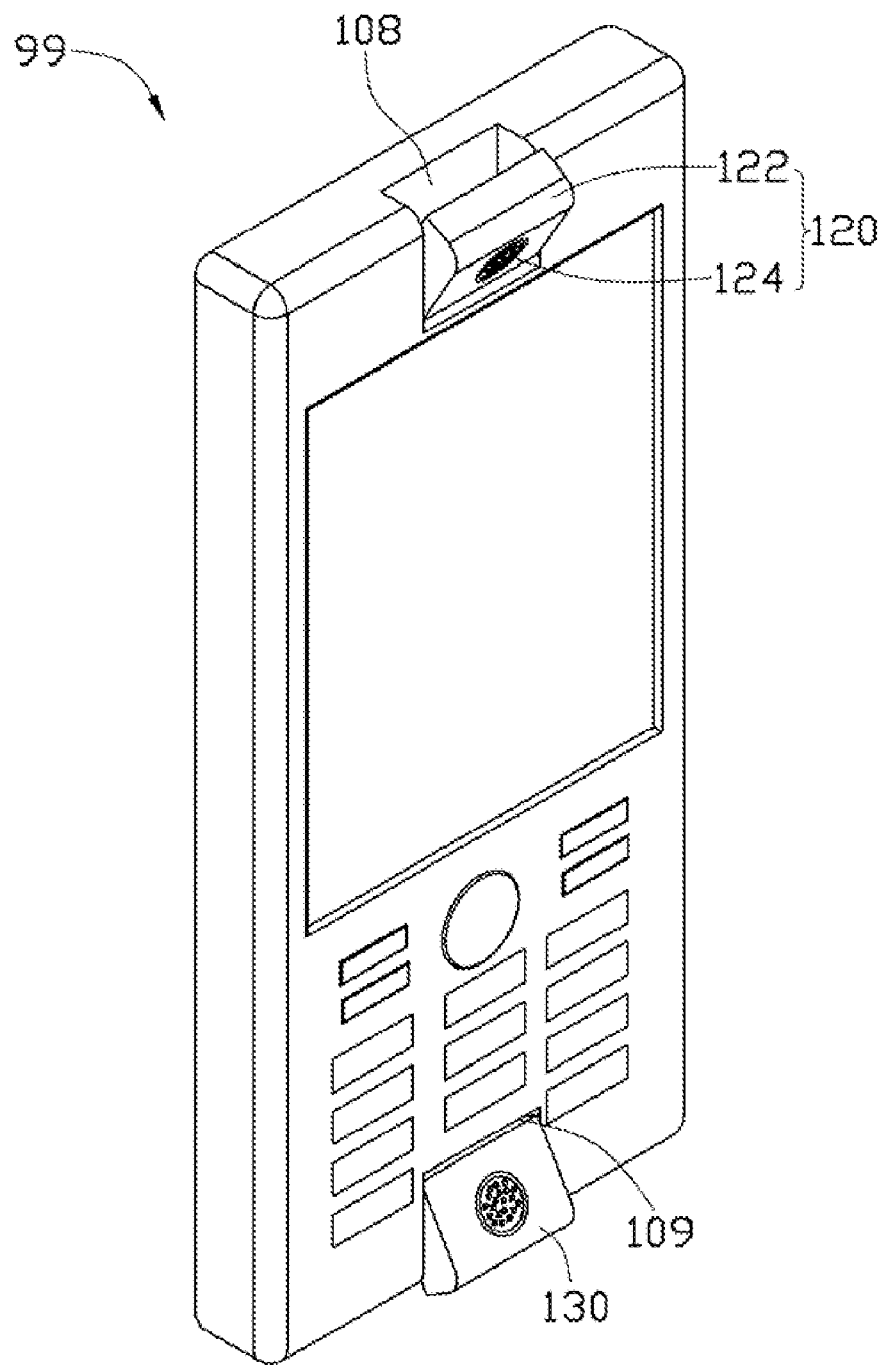
FIG. 3 is a perspective view of the mobile communication device of FIG. 1 in one state.

Referring to FIGS. 1-3, a mobile communication device 99 includes a main body 100, a communication unit 110, an earpiece 120, a mouthpiece 130, a comparison unit 140, a first driver 150, and a second driver 160. The communication unit 110, the comparison unit 140, the first driver 150, and the second driver 160 are received in the main body 100.

The main body 100 is substantially rectangular. The main body 100 includes a front surface 102, a display 104 and a keyboard 106 located on the front surface 102. The front surface 102 respectively defines a first receiving space 108, and a second receiving space 109 at the upper end and the lower end thereof.

The communication unit 110 is used for establishing and canceling a connection between the mobile communication device 99 and another communication device, generating a starting signal when the connection between the mobile communication device 99 and another communication device is established, and generating a completion signal when the connection between the mobile communication device 99 and another communication device is canceled.

The earpiece 120 is received in the first receiving space 108 of the main body 100, and is capable of rotating with respect to the main body 100. The earpiece 120 is used for receiving audio signals from another communication device through the communication unit 110, and outputting the audio signals so that a user of the mobile communication device 99 can hear audio corresponding to the audio signals.

The mouthpiece 130 is received in the second receiving space 109 of the main body 100, and is capable of rotating with respect to the main body 100. The mouthpiece 130 is used for receiving ambient sound, and determining an ambient noise level according to the collected ambient sound in response to the starting signal.

The comparison unit 140 is used for determining whether the ambient noise level obtained by the mouthpiece 130 is equal to a predetermined value, and generating a first driving signal when it is determined that the ambient noise level is not equal to the predetermined value.

The first driver 150 is used for driving the earpiece 120 to rotate towards an ear of the user in response to the first driving signal. The second driver 160 is used for driving the mouthpiece 130 to rotate towards the mouth of the user in response to the first driving signal.

The comparison unit 140 is further used for determining whether the ambient noise level obtained by the mouthpiece 130 is higher or lower than the predetermined value. If it is determined that the ambient noise level is higher than the predetermined value, the comparison unit 140 generates a second driving signal. When it is determined that the ambient noise level is lower than the predetermined value, the comparison unit 140 generates an adjusting signal.

The earpiece 120 includes an enclosure 122, a cylindrical earplug 124 received in the enclosure 122, a third driver 126, and a volume adjusting module 128. The earplug 124 is capable of partially protruding out of the enclosure 122. The earplug 124 is used for receiving audio signals from another communication device through the communication unit 110, and outputting the audio signals such that the user of the communication device 99 can hear audio corresponding to the audio signals.

Figure 4:
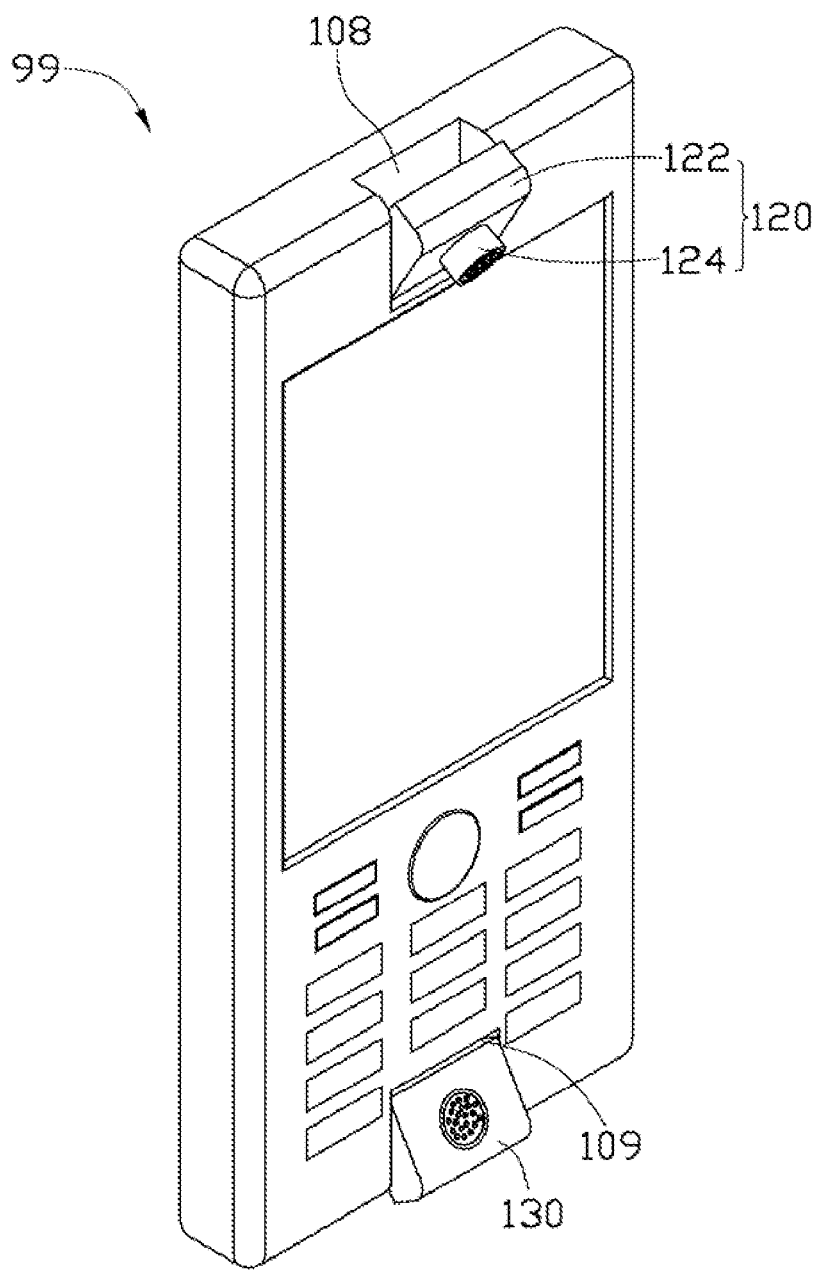
FIG. 4 is a perspective view of the mobile communication device of FIG. 1 in another state.

The third driver 126 is used for driving the earplug 124 to protrude out of the enclosure 120 and insert into the ear of the user (referring to FIG. 4) in response to the second driving signal. The volume adjusting module 128 is used for turning down the volume on the earplug 124 to a first predetermined level in response to the second driving signal, and further used for turning down the volume on the earplug 124 to a second predetermined level in response to the adjusting signal. The second predetermined level is lower than the first predetermined level.

In addition, the first driver 150 is further used for restoring the earpiece 120 to return to the first receiving space 108 in response to the completion signal. The second driver 160 is further used for restoring the mouthpiece 130 to return to the second receiving space 109 in response to the completion signal. The third driver 126 is used for restoring the earplug 124 to return to the enclosure 122 in response to the completion signal.

Figure 5:
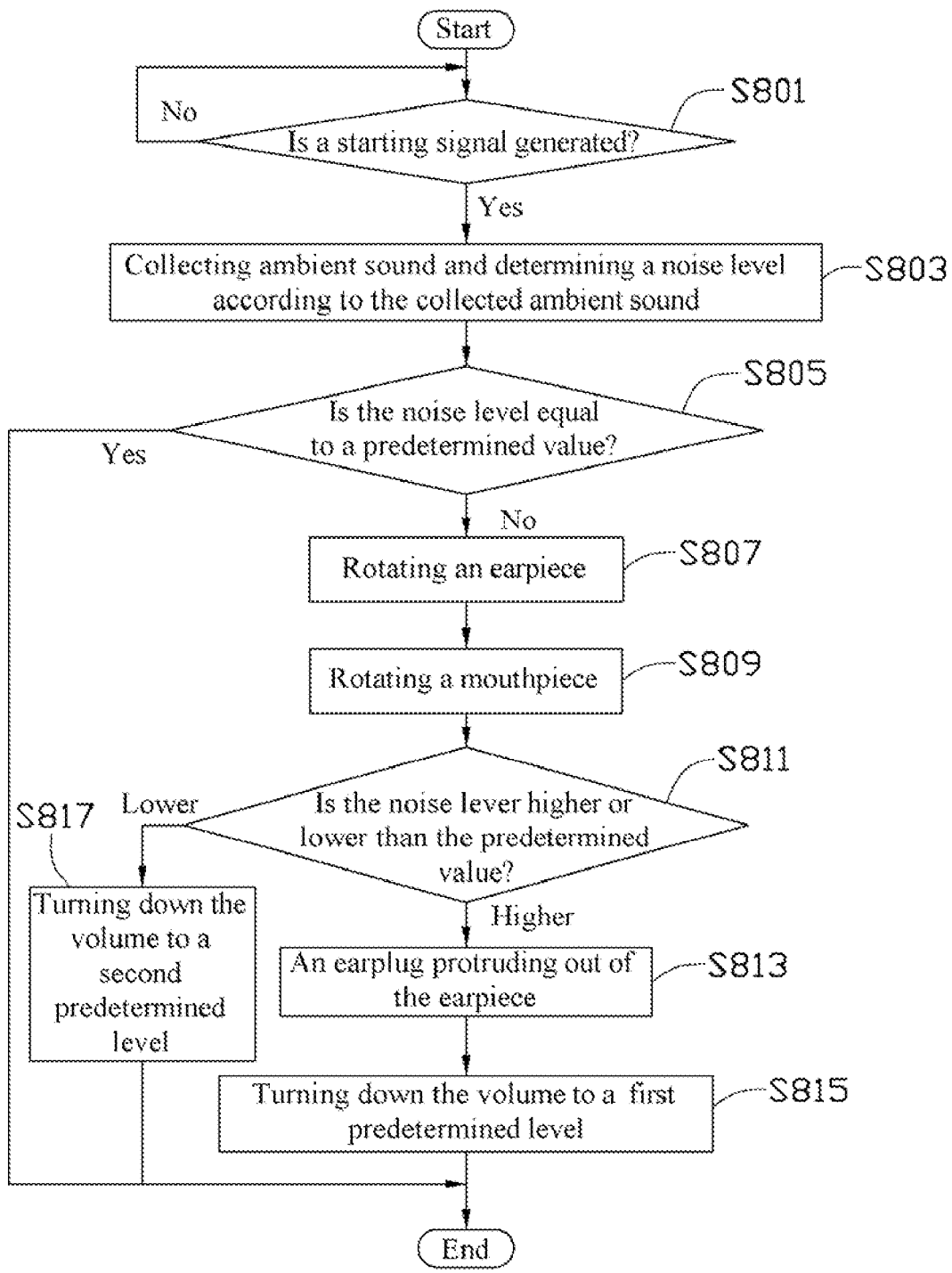
FIG. 5 is a flowchart of a communication method of a mobile communication device in accordance with an exemplary embodiment.

Referring to FIG. 5, a communication method of a mobile communication device is provided. The mobile communication device includes a main body, a communication unit, an earpiece, and a mouthpiece. The earpiece and the mouthpiece are capable of rotating with respect to the main body. The communication unit is used for establishing a connection between the mobile communication device and another communication device, and generating a starting signal when the connection between the mobile communication device and another communication device is established. The earpiece includes an enclosure and an earplug received in the enclosure, and the earplug is capable of partially protruding out of the enclosure. The earplug is used for receiving audio signals from another communication device through the communication unit, and outputting the audio signals so that a user of the communication device can hear audio corresponding to the audio signals. The method includes the following steps.

In step S801, determining whether the starting signal is generated. If it is determined that the starting signal is generated, step S803 is implemented. If it is determined that the starting signal is not generated, step S801 is repeated.

In step S803, collecting ambient sound of the mobile communication device, and determining an ambient noise level according to the collected ambient sound. In the embodiment, the step S803 is implemented by the mouthpiece.

In step S805, determining whether the ambient noise level is equal to a predetermined value. If it is determined that the ambient noise level is not equal to the predetermined value, step S807 is implemented. If it is determined that the ambient noise level is equal to the predetermined value, the procedure is ended.

In step S807, rotating the earpiece towards an ear of the user.

In step S809, rotating the mouthpiece towards the mouth of the user.

In step S811, determining whether the ambient noise level is higher or lower than the predetermined value. If it is determined that the ambient noise level is higher than the predetermined value, step S813 is implemented. If it is determined that the ambient noise level is lower than the predetermined value, step S817 is implemented.

In step S813, driving the earplug to partially protrude out of the enclosure and insert into the ear of the user.

In step S815, turning down the volume on the earplug to a first predetermined level.

In step S817, turning down the volume on the earplug to a second predetermined level. The second predetermined level is lower than the first predetermined level.

In use, when the user of the mobile communication device 99 is located in noisy environment, such as a public house or a railway station, thus the ambient volume is high, the earpiece 120 and the mouthpiece 130 are respectively driven by the first driver 150 and the second driver 160 to rotate towards the ear and mouth of the user, and the earplug 124 is driven by the third driver 126 to protrude out of the enclosure 124 and insert into the ear of the user. Therefore, the ambient sound affects is minimized and the communication quality is improved. Furthermore, when the earplug 124 is being inserted into the ear of the user, the volume of the audio coming from the earplug 124 may be too loud resulting in harm to the inner ear, thus the volume adjust module 128 turns down the volume on the earplug 124 to the first predetermined level.

In addition, when the user of the mobile communication device 99 is located in quiet environment, such as a library, thus the ambient volume is low, the earpiece 120 and the mouthpiece 130 are respectively driven by the first driver 150 and the second driver 160 to rotate towards the ear and mouth of the user. Therefore, the user of the mobile communication device 99 can speak softly with a user of another communication device. Meanwhile, the volume adjust module 128 turns down the volume on the earplug 124 at the second predetermined level, thus other persons are not affected.

It is to be understood, even though information and advantages of the present embodiments have been set forth in the foregoing description, together with details of the structures and functions of the present embodiments, the disclosure is illustrative only; and that changes may be made in detail, especially in matters of shape, size, and arrangement of parts within the principles of the present embodiments to the full extent indicated by the broad general meaning of the terms in which the appended claims are expressed.

What is claimed is:

1. A mobile communication device, comprising:
    a main body;
    a communication unit adapted to establish a connection between the mobile communication device and another communication device, and generating a starting signal when the connection between the mobile communication device and the another communication device is established;
    an earpiece of the mobile communication device configured to rotate with respect to the main body, the earpiece adapted to receive audio signals from the another communication device through the communication unit of the mobile communication device, and outputting the audio signals so that a user of the mobile communication device can hear audio corresponding to the audio signals;
    a mouthpiece adapted to collect ambient sound of the mobile communication device, and determine an ambient noise level according to the collected ambient sound in response to the starting signal;
    a comparison unit adapted to determine whether the ambient noise level obtained by the mouthpiece is equal to a predetermined value, and generate a first driving signal when it is determined that the ambient noise level obtained by the mouthpiece is not equal to the predetermined value; and
    a first driver adapted to drive the earpiece to rotate in response to the first driving signal.

2. The mobile communication device according to claim 1, further comprising a second driver; the mouthpiece capable of rotating with respect to the main body; the second driver adapted to drive the mouthpiece to rotate towards the mouth of the user in response to the first driving signal.

3. The mobile communication device according to claim 1, wherein the comparison unit is further adapted to determine whether the ambient noise level obtained by the mouthpiece is higher or lower than the predetermined value, and generate a second driving signal when it is determined that the ambient noise level obtained by the mouthpiece is higher than the predetermined value; the earpiece comprises an enclosure, an earplug received in the enclosure and a third driver; the earplug is capable of partially protruding out of the enclosure; the earplug is adapted to receive audio signals from the another communication device through the communication unit, and outputting the audio signals; the third driver is adapted to drive the earplug to protrude out of the enclosure and insert into the ear of the user in response to the second driving signal.

4. The mobile communication device according to claim 3, wherein the earpiece further comprises a volume adjusting module; the volume adjusting module is adapted to turn down the volume on the earplug to a first predetermined level in response to the second driving signal.

5. The mobile communication device according to claim 3, wherein when it is determined that the ambient noise level obtained by the mouthpiece is lower than the predetermined value, the comparison unit is adapted to generate an adjusting signal; the volume adjusting module is adapted to turn down the volume on the earplug to a second predetermined level in response to the adjusting signal.

6. A communication method of a mobile communication device, the mobile communication device comprises: a main body, a communication unit, an earpiece, and a mouthpiece; the earpiece is configured to rotate with respect to the main body; the communication unit is used for establishing a connection between the mobile communication device and another communication device, and generating a starting signal when the connection between the mobile communication device and the another communication device is established; the method further comprising:
   determining whether the starting signal is generated;
   when the starting signal is generated, collecting ambient sound of the mobile communication device and determining an ambient noise level according to the collected ambient sound;
   determining whether the ambient noise level is equal to a predetermined value; and
   when the ambient noise level is not equal to the predetermined value, rotating the earpiece towards an ear of a user.

7. The method according to claim 6, wherein the earpiece comprises an enclosure and an earplug received in the enclosure, and the earplug is capable of partially protruding out of the enclosure; the earplug is adapted to receive audio signals from the another communication device through the communication unit, and output the audio signals so that a user of the mobile communication device can hear audio corresponding to the audio signals; after the step that if the ambient noise level is not equal to the predetermined value, rotating the earpiece, the method further comprises:
   determining whether the ambient noise level is higher or lower than the predetermined value; and
   if it is determined that the ambient noise level is higher than the predetermined value, driving the earplug to protrude out of the enclosure and insert into the ear of the user.

8. The method according to claim 7, wherein after the step that if it is determined that the ambient noise level is higher than the predetermined value, driving the earplug to protrude out of the enclosure and insert into the ear of the user, the method further comprises:
   turning down the volume on the earplug to a first predetermined level.

9. The method according to claim 7, further comprising:
   if it is determined that the ambient noise level is lower than the predetermined value, turning down the volume on the earplug to a second predetermined level.

10. The method according to claim 6, wherein the mouthpiece is capable of rotating with respect to the main body, the method further comprises:
   when the ambient noise level is not equal to the predetermined value, rotating the mouthpiece towards the mouth of the user.

11. The method according to claim 6, wherein the step of collecting ambient sound of the mobile communication device and determining the ambient noise level according to the collected ambient sound is implemented by the mouthpiece.

12. A mobile communication device, comprising:
   a main body with a first receiving space, and a second receiving space;
   a communication unit adapted to establish a connection between the mobile communication device and another communication device, and generating a starting signal when the connection between the mobile communication device and the another communication device is established;
   an earpiece received in the first receiving space, the earpiece configured to rotate with respect to the main body; the earpiece comprising an enclosure, an earplug received in the enclosure; the earplug configured to partially protrude out of the enclosure; the earplug is adapted to receive audio signals from the another communication device through the communication unit, and outputting the audio signals so that a user of the mobile communication device can hear audio corresponding to the audio signals;
   a mouthpiece adapted to collect ambient sound of the mobile communication device, and determines an ambient noise level according to the collected ambient sound in response to the starting signal;
   a comparison unit adapted to determine whether the ambient noise level obtained by the mouthpiece is higher or lower than a predetermined value, and generate a first driving signal and a second driving signal when it is determined that the ambient noise level obtained by the mouthpiece is higher than the predetermined value; and
   a first driver adapted to drive the earpiece to rotate in response to the first driving signal;
   wherein the earpiece further comprises a third driver and a volume adjusting module; the third driver is adapted to drive the earplug to protrude out of the enclosure and insert into an ear of the user in response to the second driving signal; and the volume adjusting module is adapted to turn down the volume on the earplug to a first predetermined level in response to the second driving signal.

13. The mobile communication device according to claim 12, wherein when it is determined that the ambient noise level obtained by the mouthpiece is lower than the predetermined value, the comparison unit is adapted to generate an adjusting signal; the volume adjusting module is adapted to turn down the volume on the earplug to a second predetermined level.

14. The mobile communication device according to claim 13, wherein the second predetermined level is lower than the first predetermined level.

15. The mobile communication device according to claim 12, wherein the communication unit is further adapted to cancel the connection between the mobile communication device and the another communication device, and generates a completion signal when the connection between the mobile communication device and the another communication device is canceled; the first driver is further adapted to restore the earpiece to return to the first receiving space in response to the completion signal, and the third driver is further adapted to restore the earplug to return to the enclosure in response to the completion signal.

16. The mobile communication device according to claim 12, further comprising a second driver; the mouthpiece capable of rotating with respect to the main body; the second driver adapted to drive the mouthpiece to rotate towards the mouth of the user in response to the first driving signal.

17. The mobile communication device according to claim 16, wherein the communication unit is further adapted to cancel the connection between the mobile communication device and the another communication device, and generates a completion signal when the connection between the mobile communication device and the another communication device is canceled; the second driver is further adapted to restore the mouthpiece to return to the second receiving space in response to the completion signal.

* * * * *